PROCESS OF OBTAINING BERYLLIUM AND ALUMINUM COMPOUNDS

Original Filed Oct. 14, 1930

INVENTORS:
C. B. Sawyer
Bengt Kjellgren
By Paul Schr ATTORNEY

Reissued Dec. 22, 1936 Re. 20,214

UNITED STATES PATENT OFFICE 20,214

PROCESS OF OBTAINING BERYLLIUM AND ALUMINUM COMPOUNDS

Charles B. Sawyer and Bengt Kjellgren, Cleveland Heights, Ohio, assignors to The Brush Beryllium Company, Cleveland, Ohio, a corporation of Ohio Original No. 1,823,864, September 15, 1931, Serial No. 488,862, October 14, 1930. Application for reissue September 14, 1933, Serial No. 689,496. In Canada January 6, 1927

14 Claims. (Cl. 23—19)

We have filed applications for patent in Canada, Serial No. 320,889, Jan. 6, 1927, and in Germany, Serial No. 129,473, Jan. 31, 1927.

This invention relates to a process for the extraction of beryllium and aluminum from ores containing them, such as beryl.

Heretofore there has been no satisfactory method of recovering beryllium from the ore beryl because of the latter's extremely high resistance to the action of most reagents.

One object of this invention is to provide a method of treating beryl to make it more susceptible to the action of suitable reagents.

A further object of the invention is to provide a relatively simple and cheap process for converting the beryllium and aluminum naturally occurring in the ore into soluble beryllium and aluminum salts from which the corresponding oxides may be formed.

Other objects of the invention will be apparent to those skilled in the art from the description of it hereinafter given.

In describing our process, reference will be made to the accompanying drawing which illustrates certain features of the process.

In the drawing, Fig. 1 is a series of curves showing the effect of heat treatment of beryl at various temperatures upon acid recovery treatment at approximately atmospheric pressure.

Figure 1:
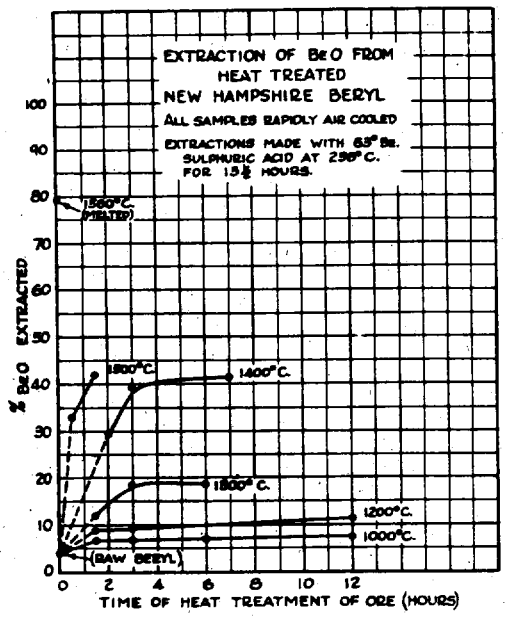

Our invention is based primarily on the discovery that beryllium and aluminum occurring in beryl may be made susceptible to the action of suitable reagents by subjecting the beryl to the action of heat in a manner to modify its physical structure and so render it more readily attacked by the reagent to be used.

The heat treatment of the beryl can be carried out at various temperatures. The resulting modification of the reactivity of the ore begins at temperatures below 1000° C. and increases as the temperature of the treatment is increased. However, the increase in the effect of the treatment with increase in the temperature of the treatment is relatively slow below 1000° C. and becomes more rapid at temperatures above 1000° C. The maximum effect is secured by heating the ore to melting, at temperatures normally ranging from 1500° to 1600° C., and such treatment renders the ore readily attackable by sulphuric acid. However, when the beryl is heated at the more moderate temperature of sintering, such as about 1350° C., and at still lower temperatures, it is modified so that it is attacked by certain reagents, such as sulphuric acid, although if the heat treatment of the ore is carried out at temperatures below its melting point the treatment generally must be continued for a longer time than when the beryl is completely melted and also it may be necessary to treat the ore at a higher temperature with the reagent if the ore has not been heated to the point of complete melting.

The modification of the reactivity of the ore due to heating is not so pronounced if the ore is allowed to cool very slowly. Therefore, both as a matter of convenience and to secure the maximum effect of the treatment, we rapidly cool the heated ore preferably by quenching it in a suitable medium, such as water. This fixes the ore in its modified state. It is possible to cool the ore in air fairly rapidly but in order to secure a maximum rate of cooling we prefer to use a liquid quenching medium. The maximum reactivity of the ore is secured by quenching it from the molten state. The effect of quenching upon the reactivity is less if the ore is heat treated at lower temperatures.

We have found that beryl may be heated, as for example, in a recuperative oil fired furnace, or in an electric furnace, above the fusion point so that it forms a free flowing molten liquid and, therefore, the heating can be carried out if desired in a furnace of such character that the molten beryl will continuously run out directly into a quenching medium such as water. Or if preferred, the beryl can be melted in a furnace and poured at intervals into the quenching medium.

After modification of the beryl by any of the above methods, the beryl may be treated with a suitable reagent to attack the beryllium and aluminum content of the beryl. While it is possible to use hydrochloric acid, nitric acid, an aqueous solution of sodium hydroxide or other bases, and other reagents, to extract the aluminum and beryllium in beryl that has been modified by our improved process, we prefer to employ one of the mineral acids, and especially sulphuric acid, as the reagent.

To facilitate the reaction between the beryl and the reagent selected, said modified beryl can be comminuted, as in a suitable grinding mill.

The said reagent is preferably one which will render the aluminum and beryllium content of the beryl soluble in water but which will leave the silica content thereof in insoluble condition. The said reagent may be mixed with said beryl and heated to a temperature sufficiently high and for a time sufficiently long to render said aluminum and beryllium soluble, as by the conversion thereof to soluble salts.

It may be noted that in general the more completely the beryl is modified, the greater is the reactivity attainable. Thus, the strength of reagent and the time and temperature required for the reaction between the beryl and reagent varies with the degree of modification of the beryl, which in turn varies, within limits, with the temperature to which the beryl has been heated, the length of heating and the rapidity of the cooling of said beryl, if it is desired to specially cool the beryl. In this connection, it may be noted that the density of the beryl appears to be an indication of the degree of modification thereof. Thus, the more complete the modification of the beryl, the lower appears to be the density thereof. For example, the density of one grade of crude beryl has been found to be 2.69, and beryl that has been melted but not quenched has a density of 2.57. Beryl melted in a pot and poured into water was found to have a density of 2.49, while the beryl melted in a furnace and run constantly over a hot lip into water had a still lower density of 2.46.

As above indicated, we have found that sulphuric acid, preferably somewhat diluted, such as concentrations between 46 and 63 degrees Baumé, is a suitable reagent to render soluble the aluminum and/or beryllium content of beryl. Thus, for example, sulphuric acid may be mixed with modified beryl to an amount slightly greater than that theoretically required to react with the aluminum and beryllium and the mixture heated in a suitable vessel, such as, for example, an open lead pot or even an iron pot. Thus for example, we have found that the reaction between the modified beryl and sulphuric acid may be substantially completed by heating for a relatively short time, such as an hour or less at substantially atmospheric pressure. It will be understood that the reaction between the beryl and sulphuric acid may be carried out by heating the reaction mixture for longer or shorter times, depending in part upon the temperature employed.

We have discovered that the temperature and pressure at which the treatment of the modified ore with the acid or other reagent is carried out are important factors affecting the degree of extraction of the beryllium and aluminum contents of the ore. Indeed the effect of increasing the temperature and pressure in treating the ore with sulphuric acid, for example, is so marked that the treatment under pressure may under some conditions be a major consideration in the practice of our process. Furthermore, we have found that the increased reactivity secured by treatment under pressure holds true in the case of raw or unheated beryl as well as in the case of heat treated ore. Treatment of the ore under pressure can be carried out with sulphuric acid, for example, in a closed tube or, on a larger scale, in a lead lined autoclave or other suitable container. At a later point in the description we shall refer further to the treatment under pressure in connection with the drawing.

By taking advantage of the differential reactivities of the beryllium and aluminum compounds as existing in the modified beryl and of the various factors affecting the activity of the sulphuric acid in converting the beryllium and aluminum compounds of such beryl into soluble sulphates, the beryllium and aluminum may either be extracted successively or simultaneously, as desired. For example, if a beryl such as is found in South Dakota is melted and treated with sulphuric acid of about the concentration of chamber acid and at a temperature of about 200° C., a good extraction of the beryllium from the treated beryl is obtained. With the said acid at a higher temperature, such as 250° C. for instance, the aluminum is also attacked, and it will thus be seen that variation of the temperature affords a method for the separate extraction of the beryllium and aluminum contained in the original beryl. Beryls from other deposits may have both the beryllium content and aluminum content rendered soluble even by the first of these two treatments and therefore the amount of action or the activity of the acid in attacking the beryllium and aluminum compounds of the beryl will have to be diminished, if it be desired to extract the beryllium and aluminum successively, as will be more fully explained. And beryls from still other deposits, on the other hand, may need to have the activity of the acid increased, depending upon the composition of the beryl. The beryllium and aluminum may either be extracted successively or simultaneously, as desired, depending upon the degree of modification of the beryl, the concentration of the acid used and the temperature and time of reaction between the acid and the comminuted beryl.

When the beryllium and aluminum contents of the beryl are attacked to form the soluble aluminum and beryllium sulphates, the silica is left as a silicic acid completely dehydrated if the temperature of treatment is sufficiently high.

The product of the reaction between the beryl and a suitable reagent, such as, for example, sulphuric acid, may be treated with water or other liquid, the soluble aluminum and beryllium compounds dissolved therein, the solution filtered to remove insoluble material and the aluminum and beryllium compounds recovered from such filtrate, by methods hereinafter described.

Dependent on the composition of the natural beryl, there may be also considerable quantities of iron sulphate in the sulphate solution. After removing the aluminum and beryllium, a final mother liquor with the iron content therein remains.

In carrying out our process, after treatment of the modified beryl with sulphuric acid we prefer to extract the sulphates with water from the sulphated material so as to make an aqueous solution of the sulphates. From this solution the aluminum sulphate may be completely separated by converting it into an alum, for example, ammonia alum, by adding a sufficient amount of ammonium sulphate, and subsequently removing the alum by crystallization. It has been known that a major portion of the aluminum can be separated from the other sulphates as an alum, but heretofore it has never been possible to secure a complete separation. According to the present invention a complete separation may be attained by either of two methods, both of which are based on the discovery that an alum, such for example as ammonia alum or potassium alum, is substantially insoluble in an aqueous solution, of suitable concentration and temperature, containing a mixture of beryllium sulphate and an alkali sulphate, such for example as ammonium sulphate or potassium sulphate.

A saturated solution of beryllium sulphate dissolves some ammonia alum at room temperature. If, however, ammonium sulphate is added the solubility of ammonia alum in this solution rapidly decreases and is practically zero at about 18° C., when the amount of ammonium sulphate approaches about 6% of the weight of crystalline beryllium sulphate in solution. If the beryllium sulphate solution is not saturated a greater amount of ammonium sulphate has to be added. Also if the temperature of the beryllium sulphate solution is increased, more ammonium sulphate has to be added. For practical purposes it is preferable to use an amount of ammonium sulphate equal to 10–20% of the weight of the crystalline beryllium sulphate present in order to secure a wider usable range of concentrations and temperatures.

Very high percentages of ammonium sulphate can also be used, but it is, of course, preferable to use as little ammonium sulphate as practically possible. If the amount of ammonium sulphate is less than about 6% of the weight of the crystalline beryllium sulphate the alum may still be completely separated by cooling the solution to temperatures lower than ordinary room temperatures.

One of the two separation methods referred to consists in separating the alum by adding to the sulphate solution obtained by leaching the sulphatized ore an excess of ammonium sulphate whereby the ammonia alum formed becomes substantially insoluble in the solution and the beryllium sulphate remains entirely soluble. The excess of ammonium sulphate used depends to some degree on the concentration of the sulphate solution. In order entirely to remove all the ammonia alum, it is preferable to carry out the crystallization in such a way that also some beryllium sulphate is crystallized out together with the ammonia alum. After separating the ammonia alum by filtration or otherwise, the beryllium sulphate content of the alum may be washed out and the washings returned to the aqueous sulphate solution obtained from the leaching of the ore. The mother liquor obtained after separating the alum contains practically all the beryllium sulphate together with the iron content of the ore. By evaporation and crystallization of the beryllium sulphate from this mother liquor most of the iron is left in the mother liquor and a crystalline beryllium sulphate containing very little iron obtained.

The other method of separating the alum consists in adding to the sulphate solution obtained by leaching the sulphated ore enough ammonium sulphate to form ammonia alum and then crystallizing out beryllium sulphate and ammonia alum together. After separation of the mixed crystals these crystals are leached with a suitable solution containing beryllium sulphate and ammonium sulphate. Such a leaching solution may contain, for example, 250 grams of crystalline beryllium sulphate per liter and 60 grams of ammonium sulphate per liter. A solution of this concentration is capable of extracting about 570 grams of beryllium sulphate per liter at 20° C. from a mixture of beryllium sulphate and alum without dissolving the alum. The leaching process is carried out by stirring the mixed crystals preferably at room temperature or lower temperatures with the leaching solution. By this treatment all of the beryllium sulphate crystals are dissolved and the ammonia alum crystals left. The ammonia alum is further separated from the solution by filtration or otherwise and the beryllium sulphate in the filtrate recovered by evaporation and crystallization. The remaining mother liquor containing ammonium and beryllium sulphates may then be used again for leaching purposes after proper dilution with water.

It will be seen that whichever of the two procedures for separating the alum is used there is involved essentially the use of a solution of beryllium sulphate and an alkali sulphate which contains an amount of the alkali sulphate sufficient to render the alum completely insoluble in the solution of the concentration and temperature employed.

In each of the above described methods of separating the aluminum content the beryllium sulphate formed generally contains some iron. This beryllium sulphate is purified by recrystallization.

In all of the crystallizing operations herein described in which iron is present it should preferably be in the ferrous state and such condition can be insured by any well known method, such as the introduction of sulphur dioxide or barium sulphide.

The iron which remains in the mother liquor obtained from the crystallization of beryllium sulphate in the first described method of separating the aluminum content or from the crystallization of the mixed crystals of beryllium sulphate and ammonia alum in the second method may be largely removed therefrom in any one of several ways, such as, for example, by further concentration of the solution and crystallizing out of ferrous ammonium sulphate. The final mother liquor remaining from the iron crystallization contains substantially all the excess free acid and is sufficiently reduced in iron content to permit its use as a reagent for subsequent treatment of additional beryl, or it may be added to the sulphate solution obtained by leaching the sulphatized ore.

If the sulphate solution obtained by leaching the ore contains much free acid, ammonia may be added instead of ammonium sulphate. It will thus be seen that by the use of ammonia the excess sulphuric acid may be recovered as ammonium sulphate and thereby utilized in the process for the formation of ammonia alum.

The beryllium sulphate produced by our above described method can be decomposed into sulphur trioxide and beryllium oxide by heating to temperatures such as 800° to 1000° C. The sulphur trioxide may be converted to sulphuric acid for use in the process. Also the ammonia alum produced in the process may be decomposed into ammonium sulphate and aluminum sulphate, for example, by the process disclosed in U. S. patent to Kjellgren No. 1,752,599, thereby the ammonium sulphate used for separating the aluminum as ammonia alum being recovered. The aluminum sulphate produced in this manner may in turn be decomposed into aluminum oxide and sulphur trioxide in the same manner as the beryllium sulphate. If desired, the mixed crystals of beryllium sulphate and ammonia alum may be converted into the mixed oxides of beryllium and aluminum.

As indicative of modification of beryl by our method of heat treating the same, we have shown in Fig. 1 of the drawing a series of curves indicating the effect of the heat treatment of the beryl upon the recovery of the beryllium content by our method of treatment. It will be noted that the recovery of the beryllium content, in terms of the percent of beryllium oxide extracted, is plotted vertically against the time of the heat treatment of the beryl, the curves representing heat treatments at different temperatures. The extractions of the modified beryl were made with 100% excess of 63° Bé. sulphuric acid at 236° C. in a closed tube, the time of the acid treatment in each case being 15½ hours.

It will be observed on referring to the curves that for this particular acid treatment the effect of heat treatment at 1000° C. upon the reactivity of the beryl was measurable but relatively small. The effect of the heat treatment at 1200° C. is still greater but the increase is not marked. However, when the heat treatment of the beryl is carried out at 1300° C. the recovery of the beryllium content is markedly increased, being nearly double the recovery at 1200°. For the heat treatment of the ore at 1400° C. the recovery in turn is fully double that for the treatment at 1300° C. The data for the treatment at 1500° C. are not so full but it will be noted that the increase in the recovery for the treatment at 1500° C. is markedly greater than that for 1400° C.; and, finally, when the ore was heated to the melting point and rapidly cooled in air the recovery was increased to about eighty percent. By quenching the melted ore in water we have been able to attain a beryllium recovery of nearly 99%.

Figure 2:
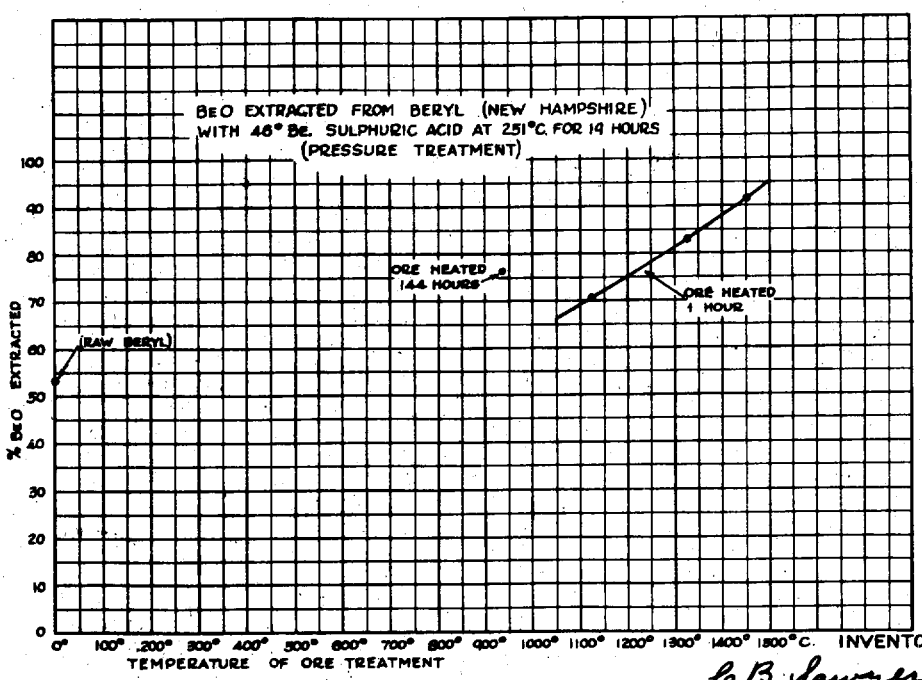
Fig. 2 is a curve and data showing the effect of heat treatment of beryl at various temperatures upon acid recovery treatment above atmospheric pressure.

In Fig. 2 of the drawing we present data which indicate the effect both of acid treatment under pressure and of the heat treatment of the ore. This figure represents treatment of heat treated beryl with 46° Bé. sulphuric acid at 251° C. (approximately 118° C. above the boiling point of the acid) for 19 hours, and the percent of beryllium oxide extracted is plotted vertically against a one-hour heat treatment of the ore at various temperatures. On comparing Fig. 2 with Fig. 1, it will be observed that the effect of the acid treatment of the ore under pressure is to very substantially increase the extraction of beryllium oxide both from the raw ore and the heat treated ore. Even in the case of the raw ore the extraction is increased by the use of pressure from a very few percent to upwards of 50%. Also, it will be seen from a comparison of these two figures that the increase in the recovery of beryllium oxide from the ore incident to the increase in the temperature of the ore treatment is even more marked when the acid treatment is carried out under substantial pressure than when it is carried out at atmospheric pressure. From Fig. 2 it will be noted that a heat treatment of the ore as low as 935° gives the relatively high extraction of beryllium oxide of 76+% if the heat treatment of the ore is sufficiently prolonged, thus bringing out the influence of the time of heat treatment of the ore.

Considering both Figs. 1 and 2, it will be seen, as we pointed out earlier in the description, that while the heat treatment of the ore at temperatures below 1000° C. somewhat increases the reactivity of the ore, the rate of increase of the reactivity with increase of temperature up to about 1000° C. is relatively slight while heat treatment of the ore at temperatures above about 1000° C. increases its reactivity more and more rapidly up to the maximum effect which is secured at the melting temperature of the ore.

Figure 3:
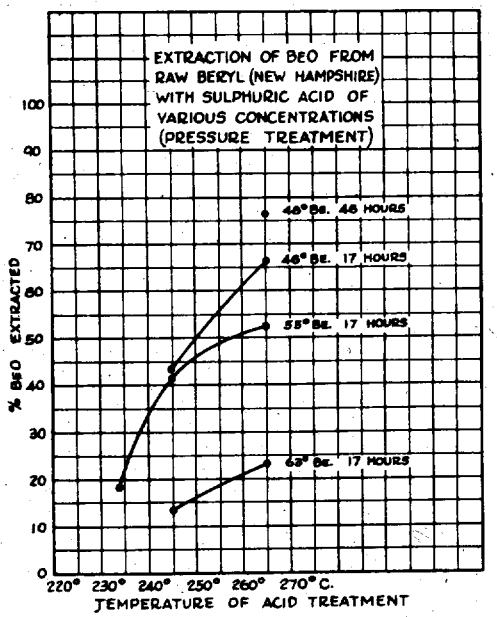
Fig. 3 is a series of curves showing the effect of treatment under pressure of raw beryl with sulphuric acid of various concentrations at various temperatures (pressures).

Fig. 3 of the drawing is a series of curves representing extraction of beryllium oxide from raw beryl by 17 hours treatment with sulphuric acid of various concentrations at various temperatures above the boiling point of the acid, the treatments being carried out in a closed container. The extraction of beryllium oxide is plotted vertically against the temperature of the acid treatment and each curve represents a particular acid concentration. This series of curves shows that the beryllium oxide extraction increases with decrease in the concentration of the acid and with increase in the temperature of the acid treatment, both of which factors correspond to increase in the pressure. The data in this figure also show the effect of the time factor in the acid treatment, the extraction of beryllium oxide by 46° Bé. acid at 265° C. being increased from about 66% to about 76% by prolonging the acid treatment from 17 hours to 46 hours.

The beryl found in different deposits varies somewhat in composition and we have found that the differences in the composition of the ore cause it to behave somewhat differently in the application of our improved method. Our study of ores of different composition has resulted in the discovery that it is possible, in the case at least of some of the ores, to improve their adaptability to our process by the addition to them of suitable substances. In particular, we have found that by the addition to certain beryls of suitable substances in very small amounts it is possible, without interfering with the successful carrying out of the various steps of our process, to very substantially lower the melting point of the ore and thus permit a modification of the ore by our improved heat treatment at a markedly lower temperature than would otherwise be possible, thus realizing substantial economic gains in the process.

Furthermore, we have found that by the addition of a suitable substance or substances it is possible to not only thus lower the melting point of the ore but also to increase the reactivity of the ore, in a manner which we do not fully understand but which we believe essentially involves a retardation of the recrystallization of the melted ore.

Among the substances which may be added to the ore for the purposes specified are compounds, oxides for example, of iron, calcium and sodium. All of these substances when added to the ore in small amounts have the effect of lowering its melting point and iron, for example, also has the marked added effect of increasing the reactivity of some ores when melted and quenched, this latter effect being due, we believe, to a retarding effect upon the recrystallization of the melted ore, thus insuring the preservation to a higher degree of the modifying effect of the heat treatment. The addition to the ore of any one or more of the substances above mentioned obviously will not interfere with any of the several steps of our process of treatment.

Two of the ores which we have used, one from New Hampshire and the other from South Dakota, will serve to illustrate the effect of the composition of the ore which we have just been describing.

| New Hampshire beryl | | South Dakota beryl | |
|---|---|---|---|
| $BeO$ | = 12.82% | $BeO$ | = 12.00% |
| $Al_2O_3$ | = 17.61% | $Al_2O_3$ | = 17.6 % |
| $Fe_2O_3$ | = 1.26% | $Fe_2O_3$ | = 0.61% |
| $K_2O,Na_2O$ | = 0.67% | $K_2O,Na_2O,Li_2O$ | = 2.3 % |

Of these two ores, that from South Dakota was found to have a lower melting point than that from New Hampshire but the latter ore, on the other hand, after melting and rapid cooling was found to have a higher reactivity to the acid treatment. By the addition of a small amount of iron oxide to the South Dakota ore we found it possible to increase its reactivity to the acid treatment, as well as to lower somewhat further its melting point, thus illustrating the effect of modifying the composition as above described.

As illustrating the character of our process we give the following specific example, in which sulphuric acid is employed as reagent:

100 lbs. of beryl, which has been melted and quenched as above explained and ground to pass a Tyler 200-mesh sieve is mixed with 120 lbs. 63° Bé. sulphuric acid, which is about 10% excess of the acid. The mixture is then heated in an iron container. As soon as the acid becomes slightly warm the reaction starts, and the temperature increases rapidly. Steam and gases go off, and the mixture seems to boil. After about ½ hour the reaction slows down. The container is then covered and heated up to 250–300° C. for about 24 hours, to dehydrate the silica formed. After cooling, the white sulphated material is broken up in lumps and leached with water. The insoluble residue is separated by filtration and the filtrate concentrated to a specific gravity of about 1.32 at 20° C.

The filtrate or solution now has a volume of about 117 liters, and contains about:

35 grams BeO per liter
49 grams $Al_2O_3$ per liter
3 grams $Fe_2O_3$ per liter in the form of sulphates.

The extracted yield of beryllium oxide is about 90%.

In order to separate the aluminum from the beryllium, ammonium sulphate is added to the solution, and ammonia alum separated by crystallization. The solution above contains 5740 grams $Al_2O_3$ as aluminum sulphate. It would require 7400 grams ammonium sulphate to form ammonia alum. However, about 25% excess ammonium sulphate, or 9400 grams, is used. It may be dissolved in water to a saturated solution and added directly to the cold sulphate solution. The ammonia alum crystallizes quickly and is separated by filtration.

The mother liquor has a volume of about 104 liters and a specific gravity of about 1.21 at 15° C.

It contains about:

33 grams BeO per liter
3.2 grams $Al_2O_3$ per liter
2.9 grams $Fe_2O_3$ per liter
19 grams free $(NH_4)_2SO_4$ per liter The acidity of the solution is 0.15 to 0.20 normal in sulphuric acid.

For removal of the last part of the aluminum present, this mother liquor is concentrated to a specific gravity of 1.32 at boiling temperature, or to a volume of about 60 liters, and then crystallized by cooling to room temperature. The crystals consisting of ammonia alum and some beryllium sulphate are separated by filtration. The filtrate is now free from aluminum according to test carried out by the 8-hydroxyquinoline separation method by Berg, as modified by Kolthoff and Sandell (Journal American Chemical Society, 50, 1900 (1929)). It has a specific gravity of about 1.30 at 20° C. and contains about:

73 grams BeO per liter and
10 grams $Fe_2O_3$ per liter in the form of sulphates.

For separation of the beryllium from the iron the filtrate is concentrated to about 1.45–1.46 specific gravity at boiling temperature, and the solution crystallized by cooling, having preferably first reduced the iron with sulphur dioxide. The crystals formed contain .01% of $Fe_2O_3$. By recrystallization of the beryllium sulphate formed the iron content of the crystals is only .002 to .003%. In other words, the beryllium sulphate is practically chemically pure.

It will be understood that the beryllium sulphate produced can be treated in various known ways to convert the beryllium content to different forms. For example, the sulphate can be converted to beryllium oxide by heating it to drive off sulphur trioxide; and the beryllium oxide, in turn, can be converted into various other compounds such as fluorides and chlorides suitable for electrolysis.

As further illustrating the practice of our improved process, we give the following example using hydrochloric acid as reagent:

A suitable amount of beryl modified, as previously explained, by melting and quenching and ground to pass a 200-mesh sieve, is mixed with concentrated hydrochloric acid largely in excess of the amount theoretically necessary to react with the silicates of the ore. We have found that an excess of 100% is suitable which is equivalent to a ratio of 4 cc. of the concentrated acid to one gram of beryl like that of the first example above given.

The mixed beryl and acid when heated react to form a solution of beryllium, aluminum and iron chlorides and with the heating conducted at 84° C. for about 19 hours the yield of beryllium chloride is approximately 66% and of the aluminum and iron chlorides combined approximately 67%.

The separation of the chlorides is effected by treatment of the solution in known ways. For example, the solution can be treated with hydrochloric acid gas at low temperatures to effect separation of the chlorides, as described by Gooch in his "Methods in Chemical Analysis", first edition, pages 214 to 216.

It is recognized that it is known to heat beryl with oxides of alkalis and alkaline earths and with magnesium oxide in order to decompose the beryl and render the formed materials soluble in sulphuric acid. It is also known to sinter or fuse aluminum silicates containing considerable amounts of alkalis, such as feldspar, in order to render them soluble in sulphuric acid. Furthermore, it is known to heat aluminum ores, such as clay, to temperatures below 900° C. to render them more reactive to sulphuric acid. However, the present process is distinguished in that the heat treatment increases the reactivity of the beryl to reagents, such as sulphuric acid, by effecting a change in the physical structure of the ore and without any substantial change in its chemical composition, and in that this increase in reactivity is secured in an ore which contains no significant amount of alkalis. The result, in the present process, is to make the ore beryl, heretofore considered highly resistant, subject to direct attack by reagents, such as sulphuric acid, which would not attack the natural beryl. In connection with the foregoing statement that in our process a change in the physical structure of the ore is effected without any substantial change in its chemical composition, it is to be observed that water of crystallization present in the ore may be driven off by the modifying treatment so that it would perhaps be more accurate to say that the present process changes the internal physical structure of the ore while substantially maintaining its original chemical composition with respect to beryllium oxide, alumina and silica. However, since raw beryl ordinarily contains very little water of crystallization it seems proper to say that no substantial change in its chemical composition results from driving off its water of crystallization.

The present application constitutes a continuation in part of our earlier filed applications Serial No. 5,169, filed January 27, 1925, and Serial No. 123,593, filed July 19, 1926. In the present application we do not claim the herein disclosed methods of recovering the beryllium and aluminum from the ore after it has been treated with sulphuric acid or other reagent, these several methods or features and certain features incidental thereto being claimed in our copending application Serial No. 536,518, filed May 11, 1931, as a division of the present application.

To those skilled in the art it will be apparent that our invention can be practiced with a variety of modifications and in various differing embodiments without departing from the spirit and scope thereof as defined in the appended claims. It will also be understood that the modified beryl produced by our process is a product which can be utilized in various ways to take advantage of its novel physical and chemical characteristics.

What we claim is:

1. The process of extracting beryllium from beryl which consists in increasing the chemical reactivity of the beryl by heating it above 1000° C. under conditions which change its original physical structure and substantially maintain its original chemical composition with respect to BeO, $Al_2O_3$, and $SiO_2$ and cooling it, and thereafter treating the modified beryl with a reagent at temperatures adapted to transform beryllium content thereof directly into a soluble form.

2. The process of extracting beryllium from beryl which consists in increasing the chemical reactivity of the beryl by heating it above 1000° C. under conditions which change its original physical structure and substantially maintain its original chemical composition with respect to BeO, $Al_2O_3$, and $SiO_2$ and cooling it, and thereafter treating the modified beryl with a mineral acid of a temperature and a concentration adapted to transform beryllium content of the beryl directly into a soluble form.

3. The process of extracting beryllium from beryl which consists in increasing the chemical reactivity of the beryl by heating it above 1000° C. under conditions which change its original physical structure and substantially maintain its original chemical composition with respect to BeO, $Al_2O_3$, and $SiO_2$ and cooling it, and thereafter treating the modified beryl with sulphuric acid of a temperature and concentration adapted to transform beryllium content of the beryl directly into beryllium sulphate.

4. The process of extracting beryllium from beryl which consists in increasing the chemical reactivity of the beryl by heating it above 1000° C. under conditions which change its original physical structure and substantially maintain its original chemical composition with respect to BeO, $Al_2O_3$, and $SiO_2$, rapidly cooling the heated material to fix its changed physical structure, and thereafter treating the modified beryl with a mineral acid of a temperature and concentration adapted to transform beryllium content of the beryl directly into a soluble form.

5. The process of extracting beryllium from beryl which consists in increasing the chemical reactivity of the beryl by heating it to a molten state under conditions which change its original physical structure and substantially maintain its original chemical composition with respect to BeO, $Al_2O_3$, and $SiO_2$, rapidly cooling the melted material to fix its modified structure, and thereafter treating the said material with a mineral acid of a temperature and concentration adapted to transform beryllium content of the beryl directly into a soluble form.

6. The process of extracting beryllium from beryl which consists in increasing the chemical reactivity of the beryl by heating it to a molten state under conditions which change its original physical structure and substantially maintain its original chemical composition with respect to BeO, $Al_2O_3$, and $SiO_2$, rapidly cooling the melted material to fix its modified structure, and thereafter treating the said material with sulphuric acid of a temperature and concentration adapted to transform beryllium content of the beryl directly into beryllium sulphate.

7. In a process of extracting beryllium from beryl, the steps of heating the raw ore above 1000° C. to modify its internal physical structure and cooling the material from its heated state with sufficient rapidity to fix its modified physical structure.

8. In a process of extracting beryllium from beryl, the steps of melting the raw ore to modify its internal physical structure and cooling the molten material by quenching.

9. The process of extracting beryllium from beryl which consists in increasing the chemical reactivity of the beryl by heating it above 1000° C. under conditions which change its original physical structure and substantially maintain its original chemical composition with respect to BeO, $Al_2O_3$, and $SiO_2$, cooling the heated material, and treating the said material in a closed container with a reagent at a temperature and concentration adapted to produce superatmospheric pressure in the container and to transform beryllium content of the said material directly into soluble form.

10. The process of extracting beryllium from beryl which consists in increasing the chemical reactivity of the beryl by heating it above 1000° C. under conditions which change its original physical structure and substantially maintain its original chemical composition with respect to BeO, $Al_2O_3$, and $SiO_2$, cooling the heated material, and treating the said material in a closed container with a mineral acid at a temperature and concentration adapted to produce superatmospheric pressure in the container and to transform beryllium content of the said material directly into soluble form.

11. The process of extracting beryllium from beryl which consists in increasing the chemical reactivity of the beryl by heating it above 1000° C. under conditions which change its original physical structure and substantially maintain its original chemical composition with respect to BeO, $Al_2O_3$, and $SiO_2$, cooling the heated material, and treating the said material in a closed container with sulphuric acid at a temperature and concentration adapted to produce superatmospheric pressure in the container and to transform beryllium content of the said material directly into beryllium sulphate.

12. In a process of extracting beryllium from beryl, the step which consists in treating the beryl in a closed container with sulphuric acid at a temperature and concentration adapted to produce superatmospheric pressure in the container and to transform beryllium content of the beryl into beryllium sulphate.

13. The process of increasing the susceptibility of beryl to the subsequent action of a chemical reagent, which process consists in a thermal treatment of the beryl above 1000° C. under conditions which change its original physical structure and substantially maintain its original chemical composition with respect to BeO, $Al_2O_3$, and $SiO_2$, and rapidly cooling the beryl from its heated state.

14. As a new and useful product, a substance produced by treating raw beryl as defined in claim 7, said substance having substantially the original chemical composition of the raw beryl with respect to BeO, $Al_2O_3$, and $SiO_2$, and a chemical reactivity to sulphuric acid that is substantially greater than that of the raw beryl.

CHARLES B. SAWYER.
BENGT KJELLGREN.